2,849,083

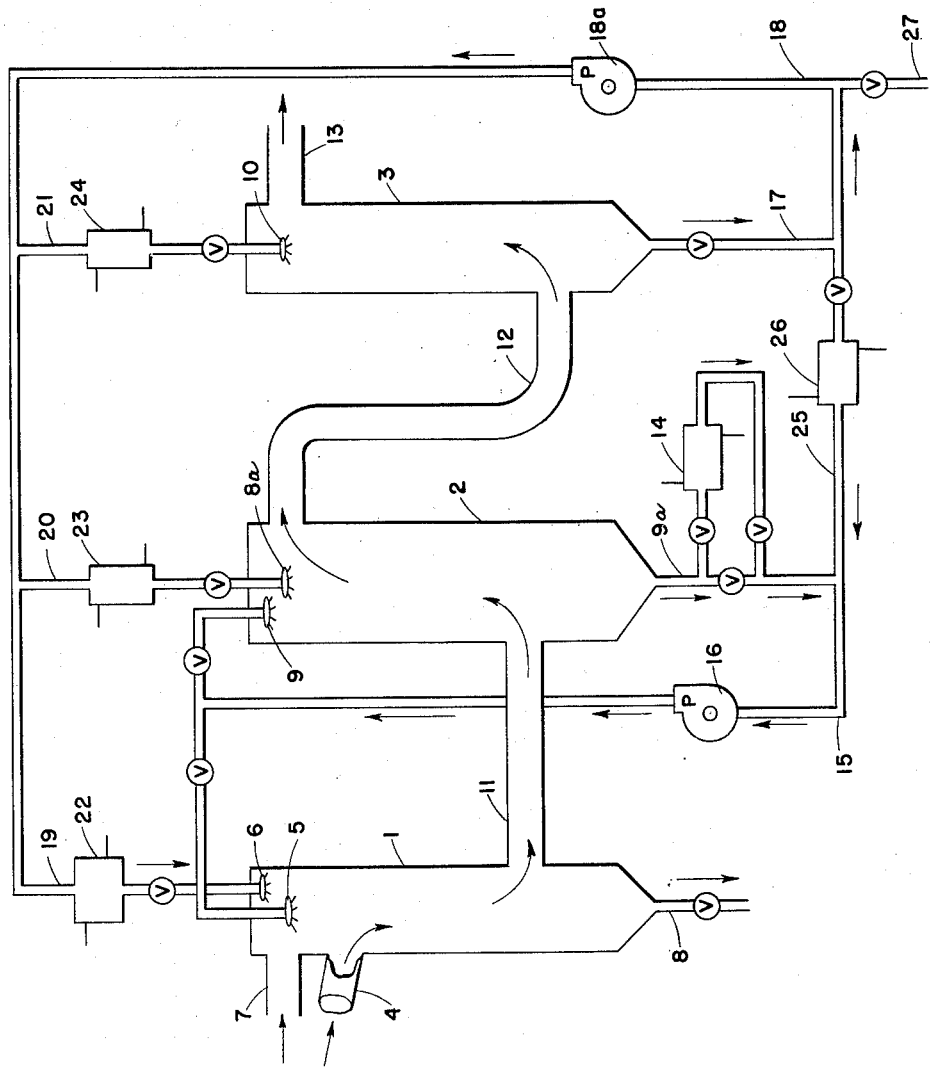

SEPARATION OF IRON CHLORIDE FROM GASEOUS IRON CHLORIDE-TITANIUM TETRACHLORIDE MIXTURES

Earl W. Nelson and Albert Dietz, Lynchburg, and John P. Wikswo, Amherst, Va., and William E. Trees, Savannah, Ga., assignors to American Cyanamid Company, New York, N. Y., a corporation of Maine Application January 31, 1957, Serial No. 637,556

8 Claims. (Cl. 183—120)

The present invention relates to the recovery of iron chloride from gaseous iron chloride-titanium tetrachloride mixtures. More particularly the present invention relates to a continuous process for condensing and separating iron chloride in apparently dry particulate form from crude gaseous iron chloride-titanium tetrachloride mixtures including such mixtures as are produced by chlorinating oxidic ferrotitaniferous ores and slags.

The boiling point of pure liquid titanium tetrachloride is 136° C. and the snowpoint of iron chloride is in excess of 300° C. Accordingly it has long been known that substantially all of the iron chloride content of iron chloride-titanium tetrachloride gaseous mixtures can be condensed by cooling the gaseous mixtures to an appropriate temperature, generally within the range of roughly 150°–350° C., depending on the composition of the gas. The iron chloride, however, condenses in the form of small almost dustlike particles which are difficult to collect and remove. In one such process it has been proposed to condense and wash out the iron chloride particles in one step by spraying the crude gas with sufficient liquid titanium tetrachloride to cool the gas below the snowpoint of the iron chloride and provide sufficient excess liquid titanium tetrachloride for washing purposes, cf. U. S. Patent No. 2,245,358. However, in such process the iron chloride is recovered in the form of a slurry in liquid titanium tetrachloride and the desired separation is not achieved.

It has further been proposed to spray the crude gas with only sufficient liquid titanium tetrachloride to precipitate the iron chloride in dry form, i. e., without introducing excess liquid titanium tetrachloride for washing purposes; cf. U. S. Patent No. 2,446,181. In such process, however, recovery of the iron chloride requires passage of the gas through special separatory equipment such as a cyclone (in which case elimination of the iron chloride is not complete) or a bag filter (the operation of which is troublesome and costly). In such process it is impractical to remove substantially all (e. g. more than 95% of the iron chloride) by settling as about 10% of the iron chloride condenses in the form of particles about $0.5\mu$ to $5\mu$ in diameter. Such particles are so small that they tend to remain in suspension in much the same manner as smoke.

The discovery has now been made that the iron chloride content of crude iron chloride-titanium tetrachloride gaseous mixtures can be continuously separated in apparently dry form in simple equipment by a novel combination comprising three principal steps.

In the first step the gaseous mixture is cooled by direct contact at least chiefly with a spray of recycled iron chloride-titanium tetrachloride slurry (assisted by additional coolant if necessary) to condense substantially all of the iron chloride in the gaseous mixture in the form of apparently dry particles and at the same time drying the iron chloride particles in said slurry to substantially the same form. A substantial proportion but less than substantially all of the condensed and dried iron chloride particles are settled out. This is the iron chloride product of the process.

In the second step, after completion of the settling, the effluent gaseous mixture (containing a substantial amount of iron chloride in suspended form) is sprayed with liquid titanium tetrachloride so as to scrub out substantially all of the residual suspended iron chloride particles from the gaseous mixture. Sufficient titanium chloride is employed as scrubbing agent so that the underflow is in the form of a pumpable slurry.

In the third step, the iron chloride-titanium tetrachloride slurry from the second step is recycled and sprayed into the hot crude gaseous mixture which is treated in the first step. As stated this accomplishes the twin results of freezing out the iron chloride content of the gaseous mixture and drying the iron chloride in the recycled slurry, so that a dry iron chloride product is recovered.

The effluent gaseous mixture from the second step is rich in titanium tetrachloride. The titanium tetrachloride content of this gas may be recovered by known means in liquid form and may be recycled with or without cooling beyond its condensation point to the scrubber or elsewhere in the process to supply additional cooling.

The process as described has the following principal advantages.

(1) No uncommon form of apparatus is needed. The process may be performed in chambers or towers of conventional design.

(2) Practically all of the iron chloride in the crude gas is removed, and only two towers are required for the purpose.

(3) The iron chloride is removed at only one point in the system, and is recovered as an apparently dry powder.

(4) The process does not depend on unusual control refinement. The only control instruments required are thermometers or pyrometers, so that the process is well adapted to automation.

(5) The process may be operated continuously, and plugging due to iron chloride incrustations does not occur.

The invention will be described more in detail with reference to the drawing which represents schematically one form of apparatus illustrating the practice of the invention. The apparatus shown in the drawing comprises three principal components: condensing-drying-settling chamber 1, washing tower 2, and condenser 3.

Chamber 1 contains at an upper part thereof crude gas inflow conduit 4, valved primary liquid coolant sprayhead 5 adapted to convert an iron chloride-titanium tetrachloride slurry to shower form, valved auxiliary liquid coolant sprayhead 6, and gas conduit 7 adapted to deliver cold inert gas as auxiliary coolant. Valved pipe 8 at the bottom of chamber 1 is adapted to release settled iron chloride particles therefrom as the iron chloride product.

Washing tower 2 contains at an upper part thereof valved primary liquid sprayhead 8a adapted to deliver liquid titanium tetrachloride in the form of a spray and valved auxiliary sprayhead 9 similar to spray head 5. Valved pipe 9a is adapted to permit withdrawal of iron chloride-titanium tetrachloride slurry.

Condenser 3 contains valved sprayhead 10 similar to sprayheads 6 and 8a.

Conduit 11 is adapted to permit uncondensed gas to pass from a lower part of chamber 1 to a lower part of chamber 2. Conduit 12 is adapted to permit uncondensed gas to pass from an upper part of chamber 2 to a lower part of chamber 3, and conduit 13 is adapted to discharge uncondensed gas from an upper part of condenser 3.

Indirect valved cooler 14 is connected in parallel with slurry discharge line 9a from washing tower 2. Line 15 containing pump 16 is adapted to deliver slurry to sprayheads 5 and 9 as coolant material.

Discharge line 17 from condenser 3 is adapted to deliver liquid titanium tetrachloride through main line 18, pump 18a, distributing lines 19, 20 and 21 respectively containing indirect coolers 22, 23 and 24, to sprayheads 6, 8a and 10.

Valved cross-connecting line 25 containing cooler 26 is adapted to transfer liquid titanium tetrachloride to line 15 whenever desired to decrease the viscosity of the slurry from line 9a or to supply additional primary coolant volume.

Valved discharge line 27 is adapted to transfer liquid titanium tetrachloride product to storage.

In typical operation, the hot crude iron chloride-titanium tetrachloride gaseous mixture to be purified enters condensing-drying chamber 1 at a point near the top through entrance conduit 4 and directly encounters a spray of recycled iron chloride-titanium tetrachloride slurry admitted through sprayhead 5. The gas flows concurrently downward with the slurry which is admitted at sufficient rate to decrease the temperature of the gas below the snowpoint of the iron chloride but not below the dewpoint of the titanium tetrachloride. Substantially all of the iron chloride in the gas is thereby condensed as apparently dry powder. At the same time the iron chloride content of the sprayed slurry is dried, likewise going into suspension. Necessarily substantially all the titanium tetrachloride in the slurry is vaporized. The rate of flow of the gaseous mixture through the chamber is such that a substantial proportion but less than substantially all of the iron chloride particles developed in these two ways settles to the bottom of the chamber and is periodically or continuously withdrawn through valved iron chloride discharge pipe 8, the iron chloride particles which remain in suspension passing through gas effluent conduit 11 to scrubbing tower 2. This effluent gas (which typically contains up to 0.4 to 0.9 by weight of the iron chloride content of the gas admitted through conduit 4) enters scrubbing tower 2 passing countercurrent to a downward spray of recycled liquid titanium tetrachloride admitted through valved sprayhead 8a. Substantially all of the residual iron chloride suspended in the gas is washed or scrubbed out, sufficient titanium tetrachloride being used so that the iron chloride is washed down in pumpable slurry form. Necessarily, any iron chloride vapor in the gas is condensed. The slurry leaves the tower through lower discharge pipe 9a containing valved indirect cooler 14 and is recycled through line 15 containing pump to sprayhead 5 in tower 1 as primary coolant.

The effluent gas from scrubbing tower 2 is substantially iron-free. It is transferred from an upper portion through conduit 12 to primary titanium tetrachloride condenser 3. The gas flows upwardly through this chamber countercurrent to a descending spray of cold liquid titanium tetrachloride admitted through valved sprayhead 10, so as to condense at least sufficient titanium tetrachloride for the requirements of the process. The condensed titanium tetrachloride is withdrawn from the tower through pipe 17. Liquid titanium tetrachloride needed as auxiliary coolant in the process is recycled to the condenser-drier-settler chamber and to the scrubbing and washing towers through main line 18 and distribution lines 19, 20 and 21. Any additional coolant required may be provided by admission of cold inert gas (carbon dioxide, titanium tetrachloride, chlorine, nitrogen, or non-condensibles from the system) through conduit 7, and liquid titanium tetrachloride from sprayhead 6 may be used for the purpose. Excess cold slurry, i. e., slurry in excess of that needed to cool the gas in chamber 1 may be returned to tower 2 as auxiliary coolant through sprayhead 9. Valved cross-connection 25 containing indirect cooler 26 permits the fluidity of the iron chloride-titanium tetrachloride slurry from tower 6 to be increased by admixture with titanium tetrachloride from condenser 3. This also provides means for increasing at will the volume of recycled slurry.

The effluent gas from condenser 3 which discharged through conduit 13 normally contains a minor amount of titanium tetrachloride. This can be recovered by subsequent conventional treatment which is not part of the present invention.

Operating conditions in the apparatus system may be controlled in a variety of ways. For example, the proportion of iron chloride leaving condenser-drier-settler chamber 1 through conduit 11 may be varied by enlarging or decreasing the volume of the chamber, enlargements in volume particularly in diameter tending to increase the proportion of iron chloride which is settled out. Similar results may be obtained by changing the rate of flow of gas through chamber 1, the proportion of iron chloride which is settled out decreasing as the gas flow rate rises.

The working temperature of chamber 1 is chiefly determined by the amount of iron chloride which is recycled and by its temperature. The slurry may be cooled in heat exchanger 14 to room temperature or less, the principal object being to cool the slurry sufficiently, to minimize recycling of titanium tetrachloride while providing sufficient coolant to condense substantially all of the iron chloride in the crude gas entering chamber 1. If desired, this cooling action may be assisted by liquid titanium tetrachloride admitted through sprayhead 6 or by a cold inert gas admitted through conduit 7. The invention includes the use of other known auxiliary cooling means.

The process works well with gaseous mixtures containing as little as 50% by weight of iron chloride plus titanium tetrachloride wherein the weight of the iron chloride is at least 5% of the weight of the titanium tetrachloride. The gases formed by chlorinating oxidic ferrotitaniferous materials without addition of inert diluent gas normally contain a total of 70% to 80% iron and titanium chlorides, and even when nitrogen is employed as diluent the weight of these two chlorides is usually in excess of 60%. The weight of iron chloride is 5%–20% of the weight of the titanium tetrachloride in the case of gases derived from ferrotitaniferous slags and is 45%–100% or more in the case of gases derived from ilmenite and correspondingly less in the case of natural rutiles. The gases are discharged from the chlorinator at a temperature generally in the range of 700°–1150° C. depending principally on the bed temperature employed and whether or not any preliminary cooling is effected. The gas may contain ferrous and ferric chlorides in which case the gas will leave the chlorinator at a temperature above the snowpoint of each. It is possible however to produce chlorinator gases containing substantially no ferrous chloride, substantially all the iron being in ferric form. One such method is described and claimed in copending application Serial No. 670,264 filed on July 5, 1957 by E. W. Nelson and W. E. Trees, where it is shown that it may be desirable to cool the chlorinator gases below the snowpoint of the ferrous chloride therein at a point above the chlorinating zone, whereby the ferrous chloride is refluxed back into the chlorinating zone and converted to ferric chloride by the excess chlorine which is present. The crude gaseous mixtures thus produced are suitable for treatment according to the present invention.

According to the invention, the gaseous mixture is cooled in a condenser-drier-settler chamber from its admission temperature to a temperature such that substantially all (i. e., 95% or more) of the iron chloride is condensed at a temperature not materially below the dewpoint of the titanium tetrachloride in the mixture, so that the iron chloride particles are apparently dry. (We have found that such particles are apparently dry although containing up to 10% titanium tetrachloride.) Optimum temperatures within this range vary considerably depending on the partial pressures of the gases present, and hence the optimum temperature for any particular gaseous composition is most easily found by laboratory trial as shown below. This cooling also causes any other normally solid metal chlorides in the gas to condense such as the chlorides of aluminum, magnesium, calcium, chromium, and manganese. We have found that the gaseous mixture is generally most advantageously cooled within the range of 125°–200° C. At the lower end of the range the iron chloride as discharged through pipe 8 is apt to have an excessive titanium tetrachloride content, whereas in the upper end of the range, the iron chloride is free from titanium tetrachloride but its condensation is incomplete and may produce blockage in duct 11. We prefer the temperature to be controlled so that the gas exits at a temperature of 140°–160° C. In this range the iron chloride discharged through pipe 8 generally contains a negligible amount, less than about 1% by weight, of titanium tetrachloride and yet condensation of iron chloride is sufficiently complete so that formation of incrustations or clogging does not occur.

The dwell time of the gas in the condenser-drier-settler preferably is such that the iron chloride content of the effluent gas is between about 0.4 and 0.9 of the iron chloride content of the feed gas. It is not practical to decrease the iron chloride content of the exit gas to a much lower value as an unnecessarily large chamber (or undesirably slow gas flow rate) would be required. On the other hand, an iron chloride content in the exit gas in excess of the amount indicated causes an unnecessarily large amount of slurry to be recycled which may result in recycling a larger amount of liquid titanium tetrachloride than can be volatilized.

The principal purpose of scrubber tower 2 is to remove substantially all of the iron chloride in suspension, and the amount of titanium tetrachloride sprayed into that tower through sprayheads 8a and 9 should be at least that which is sufficient for this purpose. An additional amount is preferably used to ensure that the slurry of iron chloride discharged through pipe 9a is washed down in freely pumpable form and still more may be used to provide a greater volume of coolant as required to chill the gas in chamber 1 to a preferred value. Moreover, the titanium tetrachloride delivered into tower 3 through sprayhead 10 may be pre-cooled to increase the efficiency of the liquid as coolant and heat exchanger 24 is provided for the purpose. The discharged slurry is cooled in heat exchanger 14 as required by the thermal requirements of the gas entering chamber 1. In general the slurry should be cooled to as low a temperature as practical so as to minimize need for the introduction of supplementary coolant material into chamber 1 and thus we prefer to cool the slurry to a temperature below 35° C.

The amount and temperature of liquid titanium tetrachloride which is sprayed into condenser 3 should be at least sufficient to condense enough liquid titanium tetrachloride as coolant and washing medium as described above. It will be understood that in commercial practice additional condensing capacity may and doubtless will be provided to recover substantially all the titanium tetrachloride in the gas. This additional capacity may be downstream from condenser 3. The titanium tetrachloride derived from such or other source is the equivalent of the titanium tetrachloride derived from condenser 3 for purposes of the present invention.

The apparatus system is normally started up by preheating the towers to operating temperature followed by admission of crude iron chloride-titanium tetrachloride gas at normal operating temperature into chamber 1. Sufficient recycled iron chloride-titanium tetrachloride slurry cooled to 35° C. or below in cooler 14 is sprayed into chamber 1 to decrease the exit gas temperature to 150° C., supplementary liquid titanium tetrachloride at 35° C. or below being sprayed in through sprayhead 6 when the amount of slurry is insufficient. The rate of flow of gas through conduit 4 is predetermined so that the weight of iron chloride in the gas leaving chamber 1 is between about 0.4 and 0.9 of the weight of iron chloride in the gas entering the chamber. Cooler 23 is set to deliver titanium tetrachloride at a suitable temperature, preferably 35° C. or below to scrubber 2 and sufficient titanium tetrachloride in condenser 3 is recycled to provide adequate cooling for all three towers.

When operational equilibrium is reached it is generally found that recycled iron chloride-titanium tetrachloride slurry alone is sufficient to cool the gaseous mixture in chamber 1 to within the desirable temperature range.

In the specification and claims the term "iron chloride" is used in its normal sense to designate any chlorides of iron which may be present including ferric chloride and ferrous chloride.

The invention will be more particularly described with reference to the examples. These examples illustrate specific embodiments of the invention and are not to be construed as limitations thereon.

*Example 1*

The following illustrates the treatment of a hot gaseous iron chloride-titanium tetrachloride gaseous mixture according to the process of the present invention employing an apparatus system similar to that shown in the drawing. In this embodiment the mixture was cooled chiefly by evaporation of recycled $TiCl_4$ from a slurry of iron chloride-titanium tetrachloride (assisted by titanium tetrachloride); a substantial amount of the condensed and dried iron chloride settled out in the condenser-drier-settler chamber and practially all residual iron chloride was thereafter scrubbed out with recycled liquid titanium tetrachloride. When equilibrium was attained, the amount of iron chloride product removed through pipe 8 was equivalent to the amount entering at duct 4 in the drawing.

The apparatus comprised a vertical fluid bed chlorinator, a condensing-drying-settling column, a scrubbing column, and a condensing column, the columns being connected as shown in the drawing. The chlorinator and condensing-drying-settling column were of brick-lined steel construction, the lower interior diameter of the chlorinator being 9", its upper diameter being 14" and the interior diameter of the condenser-drier-settler being 19.5". The scrubber and condenser were made of stainless steel and had respective inside diameters of 40" and 20". All four units were 48" high.

The chlorinator gas was prepared by reacting 62.5 lb./hr. of ilmenite Quilon ore concentrate containing 60.4% $TiO_2$, 9.5% FeO, 24.6% $Fe_2O_3$, 0.17% $Cr_2O_3$ and 0.36% $V_2O_5$, 11.6 lb./hr. of petroleum coke (both ground to −20 +100 mesh), and 102 lb./hr. of gaseous chlorine in the chlorinator. A bed temperature of 900° C. was maintained and liquid $TiCl_4$ at 35° C. was sprayed into the top of the reactor at the rate of 1.6 gal./hr. to condense a portion of the ferrous chloride in order to control duct losses from the reactor. As a result, the gas had an exit temperature of 775° C.

After equilibrium operating conditions had been reached, the chlorinator discharge gas entered the condenser-drying-settler chamber under a spray of 14 gal./hr. of recycled iron chloride-titanium chloride slurry containing 10% iron chloride by weight together with a spray of sufficient liquid $TiCl_4$ to cool the gas to an exit temperature of 150° C. Dry iron chloride settled to the bottom of the chamber at the rate of 45 lb./hr. equivalent to more than 98% based on the weight of the iron chloride in the feed gas entering through conduit 4. Calculations showed that of the iron chloride entering chamber 1 with the feed gas and in slurry form through sprayhead 5, 33% by weight settled out and was removed through pipe 8a, the remainder passing through conduit 11 to washing tower 2. Analysis showed the powder to contain less than 3% by weight of titanium tetrachloride. The iron chloride was in the form of an apparently dry powder composed of spheroidal granules which showed no tendency to cake on storage.

The effluent gas was passed to the scrubber chamber at 150° C. entering under a fine spray of 13 gal./hr. of TiCl₄ having a temperature of 35° C. This was sufficient to wash down essentially all of the suspended iron chloride and cool the gas to 135° C. The underflow from the tower was a fluid iron chloride-titanium tetrachloride slurry at 120° C. containing 10% iron chloride by weight.

The effluent gas from the scrubber had the following compositions by weight:

| | Percent |
|---|---|
| TiCl₄ | 71.7 |
| FeCl₂+FeCl₃ | 0.1 |
| Other metal chlorides+SiCl₄ | 0.2 |
| Cl₂ | 0.1 |
| CO₂ | 21.5 |
| CO | 4.3 |
| N₂ | 2.1 |
| Total | 100.0 |

The gas was passed into the condensing column under a spray of sufficient liquid titanium tetrachloride at 35° C. to condense sufficient liquid titanium tetrachloride needed for the earlier steps and for the service of the condenser.

A sample of the settled iron chloride was examined for particle size distribution under a microscope with the following results:

| Average particle diam.: | Percent by weight |
|---|---|
| −44μ microns | 10 |
| +44μ, −149μ microns | 30 |
| +149μ microns | 60 |
| Total | 100 |

The apparatus was shut down after 30 hours of operation and the interiors of the condenser-drier-settler chamber 1 and scrubber tower 2 were examined. No incrustations or other evidence of incipient plugging due to deposition of iron chloride could be seen; only a light film of iron chloride was deposited and this film existed only in a few areas. The boundaries of the film had angularly fractured edges showing that the film evidently broke off as fast as formed and that the process was not subject to interruption due to plugging.

Example 2

The procedure of Example 1 was repeated except that the settling temperature of the condensed iron chloride (as determined by the temperature of the exit gaseous suspension) was varied, and the amount of titanium tetrachloride associated with the settled iron chloride was determined at each temperature. In addition the fine dustlike −325 mesh fraction was determined and flow characteristics were estimated by pouring a stream of the powder through a 60° glass funnel of 2″ maximum diameter having a 1 cm. diameter stem and noting the presence or absence of free flow therein.

| Exhaust gas temp., ° C. | Settled iron chloride | | |
|---|---|---|---|
| | TiCl₄ content, percent [1] | −325 mesh fraction, percent [1] | Flow character |
| 170 | <.1 | <2 | Good. |
| 150 | 0.5 | | Do. |
| 140 | 1 | | Do. |
| 135 | 3 | 10 | Do. |
| 130 | 6 | | |
| 125 | 16 | | |
| 120 | 30 | 25 | Tends to stick. |

[1] Based on weight of iron chloride.

These results show that temperatures of 140° C. and higher are particularly beneficial as at such temperatures the amount of titanium chloride in the iron chloride product is virtually negligibly small, the amount of ultra-fine iron chloride particles low, and the flow characteristics of the iron chloride product good. The iron chloride was produced in such form as to permit its fluidized combustion with oxygen so as to regenerate elementary chlorine.

Example 3

The procedure of Example 1 was repeated. After the apparatus had arrived at operating equilibrium, precooling of the crude gas in the chlorinator with liquid titanium tetrachloride was discontinued and an equal amount of titanium tetrachloride was sprayed into the condenser-drier-settler chamber through a sprayhead positioned alongside the sprayhead through which the recycled slurry was admitted. The amount of iron chloride recovered was substantially the same. This shows that the process of the present invention may be used upon crude gases which have not been pre-cooled.

We claim:

1. A continuous process for separating iron chloride in apparently dry particulate form from a hot crude iron chloride-titanium tetrachloride gaseous mixture which comprises cooling said hot gaseous mixture at least chiefly by direct contact with recycled iron chloride-titanium tetrachloride slurry to condense substantially all of the iron chloride in said gaseous mixture in the form of apparently dry particles and at the same time drying the iron chloride particles in said slurry to substantially the same form; settling out a substantial proportion but not substantially all of said condensed and said dried particles from said gaseous mixture; separately scrubbing the gaseous mixture with sufficient liquid titanium tetrachloride to wash substantially all of the residual iron chloride particles from said gaseous mixture in the form of a pumpable slurry; and recycling said slurry to said hot gaseous mixture.

2. A process according to claim 1 wherein the temperature of the recycled iron chloride-titanium tetrachloride slurry is less than 35° C.

3. A process according to claim 1 wherein the hot gaseous mixture is cooled solely by direct contact with recycled iron-chloride-titanium tetrachloride slurry.

4. A process according to claim 1 wherein the temperature of the cooled gaseous mixture is sufficiently high that the iron chloride which is settled out contains less than 1% of titanium tetrachloride by weight.

5. A process according to claim 1 wherein the temperature of the liquid titanium tetrachloride with which the gaseous suspension is scrubbed is less than 35° C.

6. A continuous process for separating iron chloride in apparently dry form from a hot gaseous iron chloride-titanium tetrachloride mixture, which comprises passing said hot gaseous mixture into a condenser-drier-settler chamber; spraying said gas in said chamber with sufficient of a recycled iron chloride-titanium tetrachloride slurry to condense substantially all of the iron chloride in said gas in the form of apparently dry particles having a temperature such that they are substantially non-adhesive whereby the iron chloride particles in said slurry are dried to substantially the same form; settling out between 0.4 and 0.9 of said condensed and dried iron chloride particles in said chamber; passing the effluent gaseous suspension from said chamber into a scrubbing chamber; spraying said gaseous suspension in said chamber with sufficient liquid titanium tetrachloride to scrub out substantially all of said suspended iron chloride particles and to form a pumpable slurry therewith; and recycling said slurry to said condenser-drier-settler chamber.

7. A continuous process for separating iron chloride in apparently dry, free-flowing form from a hot gaseous iron chloride-titanium tetrachloride mixture which comprises passing said hot gaseous mixture into a condenser-drier-settler chamber; spraying said gas in said chamber with sufficient of a recycled iron chloride-titanium tetrachloride slurry to condense substantially all of the iron chloride in said gas in the form of apparently dry particles having a temperature sufficiently high that they contain less than 10% by weight of liquid titanium tetrachloride yet sufficiently low that they are substantially non-adhesive and at the same time drying the iron chloride particles in said slurry to substantially the same form; settling out a substantial proportion but not substantially all of said condensed and said dried iron chloride particles in said chamber; passing the effluent gaseous suspension from said chamber into a scrubbing chamber; spraying said gaseous suspension in said chamber with sufficient recycled liquid titanium tetrachloride to scrub out substantially all of the residual suspended iron chloride particles therein and to form a pumpable slurry with said iron chloride; recycling said slurry to said condenser-drier-settler chamber; passing the effluent gaseous suspension from said scrubber into a condenser and condensing liquid titanium tetrachloride therein; and recycling a part of said liquid titanium tetrachloride to said scrubber.

8. A continuous process for separating iron chloride in apparently dry form from the hot gaseous mixture formed by chlorination of oxide ferrotitantiferous material which comprises cooling said hot gaseous mixture chiefly by direct contact with sufficient of a recycled iron chloride-titanium tetrachloride slurry to a temperature between 140° C. and 200° C. thereby condensing substantially all of the iron chloride in said gaseous mixture to the form of apparently dry particles and drying the iron chloride particles in said slurry to substantially the same form; settling out between about 0.4 and 0.9 of the iron chloride particles in said gaseous mixture; separately scrubbing the gaseous mixture with sufficient liquid titanium tetrachloride to carry down substantially all of the residual iron chloride suspended therein and to form the iron chloride particles into a pumpable slurry; and recycling said slurry to said hot gaseous mixture.

References Cited in the file of this patent

UNITED STATES PATENTS

| | | |
|---|---|---|
| 2,675,889 | Frey | Apr. 20, 1954 |
| 2,677,439 | Hedberg | May 4, 1954 |